United States Patent Office 3,418,126

Patented Dec. 24, 1968

3,418,126

PHOTOGRAPHIC FILM WITH MAGNETIC RECORDING STRIPES

Ken-ichi Ariga, Syōtarō Watanabe, and Rikiji Godai, Tokyo, Japan, assignors to Konishiroku Photo Industry Co., Ltd., Tokyo, Japan, a corporation of Japan No Drawing. Filed Nov. 16, 1964, Ser. No. 411,547
3 Claims. (Cl. 96—79)

ABSTRACT OF THE DISCLOSURE

Photographic film with magnetic recording stripes comprising a light sensitive photographic emulsion layer and magnetic recording stripe, between which a subbing layer may be interposed, at least one of the recording stripes and subbing layer contains a carboxamide having the general formula $$R_n(CONH_2)_m$$

wherein R is a member selected from the group consisting of hydrogen atom and an aliphatic lower hydrocarbon radical which may have an oxygen-containing substituent, said hydrocarbon radical having the total carbon number of up to 10, *n* is a whole number of 0 to 1 and *m* is a whole number of 1 to 5.

This invention relates to photographic films with magnetic recording stripes and the method for making same. More particularly, this invention relates to a method for adhering magnetic recording stripes on the emulsion layer of a photographic film.

In the prior art of the talking pictures, an optical recording system in which recording is effected by formation of silver images on a light-sensitive photographic layer has been commonly employed. The recent trend, however, is to adopt a magnetic recording system which is more advantageous than the optical recording system because of the simplified handling and superior recording characteristics. Where a magnetic recording system is employed in the talking pictures, camera working and sound recording have to be made separately, i.e. both photographic film and magnetic recording tape should be used. In such case, although good tone quality is realized, there are some disadvantages including difficult synchronization of sound reproduction with film projection and expensiveness due to the necessity of the film and recording tape. Because of these reasons, it has become the common practice to employ a single photographic film having magnetic recording stripes coated thereon, with excepting a special case, such as Cinerama motion pictures, wherein a plurality of sound tracks are required.

Coating of magnetic recording stripes on a photographic film can be classified into the following two types, in one of which the magnetic recording stripes are coated on the surface of the film base of the said film and in the other type the magnetic recording stripes are coated on the emulsion layer of the said film. While application of the magnetic recording stripes onto the film base is relatively easy, it is considerably difficult to adhere the magnetic recording stripes firmly onto the emulsion layer. The reason for this fact is that a stock solution for preparation of magnetic recording stripes is a dispersion of a certain magnetic recording material in an organic solvent solution of nitrocellulose and/or synthetic resin. While this dispersion has an affinity to the film base, it shows poor affinity to the emulsion layer mainly comprising gelatin, and so the resulting magnetic recording stripes have so poor adhesion that it suffers from cracking and peeling. These drawbacks may be improved to a certain degree by selection of appropriate resin or solvent formulation in the stock solution.

The necessity for application of magnetic recording stripes onto the emulsion layer of a film usually arises in case of the said film being cinematographic positive film which requires extremely good adhesion to resist repeated projection over several hundred times in a movie theater or TV studio. Such extremely good adhesion could not have been realized heretofore. In practice, furthermore, a release print can be more conveniently prepared by printing images, while sound recording, onto a positive raw film previously coated with magnetic recording stripes and subsequently subjecting the said film to photographic treatment (i.e. development and fixation) than by printing images onto a positive film and subsequently applying thereto magnetic recording stripes to make said film ready for sound recording. Thus, the demand for a photographic raw film with magnetic recording stripes is being increased. As apparent for those skilled in the art, such film should be entirely prevented from exfoliation during the development and fixation, and in addition, it should be free from any additive substance which may cause adverse effect on the photographic characteristics and stability of unexposed light-sensitive emulsion layer. These requirements for a photographic film with magnetic recording stripes are difficult to be met in the art.

It is accordingly an object of the present invention to provide a photographic film with magnetic recording stripes which are entirely free from exfoliation or cracking.

Another object of the invention is to provide magnetic recording stripes on the emulsion layer of a photographic film, said stripes having no adverse influences on the photographic characteristics and stability of the said film.

Still another object of the invention is to provide a process for making a photographic film with magnetic recording stripes as mentioned before.

A still further object of the invention is to provide a method for adhering magnetic recording stripes onto the emulsion layer of a photographic film.

Other objects, features, capabilities and advantages comprehended by the present invention will be apparent from the specification and claims which will follow.

In accordance with the present invention, there is provided a photographic film having magnetic recording stripes coated on the emulsion layer of said film, in which film an aliphatic carboxamide is present in the magnetic recording stripes or in a subbing layer if it is interposed between the emulsion layer and the magnetic recording stripes.

Aliphatic carboxamides useful in this invention can be represented by the general formula $$R_n(CONH_2)_m$$

wherein R means hydrogen atom or a saturated or unsaturated aliphatic lower hydrocarbon radical which may have an oxygen-containing substituent (such as hydroxy or carbonyl group), said hydrocarbon radical having a total carbon number of up to 10, *n* is a whole number of 0 to 1, and *m* is a whole number of 1 to 5. Typical examples of the aliphatic carboxamides are saturated aliphatic mono- or poly-carboxylic acid amides such as formamide, acetamide, propionamide, butyramide, valeramide, oxamide, malonamide, succinamide, etc.; unsaturated aliphatic mono- or poly-carboxylic acid amides such as acrylamide, methacrylamide, crotonamide, propiolamide, tetrolamide, fumaramide, etc.; oxy-acid amides such as tartaramide, citramide, etc.; ketonic acid amides such as pyrvinamide, aceto-acetamide, levulinamide, etc.; and aldehyde-acid amides such as glyoxalamide. These carboxamides can be used singly or in combination. In case where the carboxamide is an unsaturated monomeric one having a polymerizable linkage, the lower molecular weight polymer derived therefrom is also effective for the purpose of the invention, so far as the said polymer can be defined by the above-indicated general formula. For example, polyacrylic (or polymethacrylic) acid amide of the formula $$-\left(CH_2-\underset{\displaystyle CONH_2}{\underset{|}{CH}}-\right)_p \quad p\leq 5$$

which can be obtained through polymerization of monomeric acrylic (or methacrylic) amide is a suitable carboxamide referred to in this invention. All of the above-specified carboxamides which are fairly soluble in an organic solvent may be easily incorporated with a stock solution containing a magnetic recording material. Because these carboxamides have good affinity to gelatin contained in a photographic emulsion, they allow us to have extremely good adhesion of magnetic recording stripes on the emulsion layer if they are present in the magnetic recording stripes per se or in a subbing layer which may be interposed between the said emulsion layer and recording stripes.

An aliphatic carboxamide useful in this invention can be incorporated at any optional proportion with a stock solution containing a magnetic recording material, which solution is subsequently applied to the emulsion layer of a photographic raw film, without causing adverse influences on the photographic characteristics and stability of unexposed photographic emulsion. The carboxamide can be used in amounts varying depending on the type of said carboxamide and on the formulation of the stock solution, and usually it is sufficient in amount of less than 30% by weight based on the dried coating weight of the magnetic recording stripes.

In the practical embodiment of the present invention, as fully described in the examples later, application of magnetic recording stripes on a photographic emulsion layer is carried out by incorporating the required amount of the carboxamide to a stock solution containing a magnetic recording material and then coating the resulted mixture on the emulsion layer of a photographic film. Alternatively, a solution of the carboxamide in water or an organic solvent is prepared and then subbed on a part of the emulsion layer which corresponds to sound tracks, and on the subbing layer thus formed, a stock solution containing a magnetic recording material is coated. Similarly good adhesion can be obtained even when magnetic recording stripes are applied to the emulsion layer of developed photographic film in the manner indicated above.

The following examples describe certain ways in which the principle of the invention has been applied, but are not to be construed as limiting its scope.

Example 1

A mixture having the following formulation is prepared:

| | Parts by weight |
|---|---|
| $\gamma$-$Fe_2O_3$ | 20 |
| Nitrocellulose | 10 |
| Plasticizer (dibutyl phthalate) | 4 |
| Butyl acetate | 56 |
| Ethyl Cellosolve | 10 |

This mixture is treated well in a disperse mill until it is thoroughly homogenized. The resulting viscous solution is added with 2 parts of formamide ($HCONH_2$) and stirring is continued until the solution becomes uniform again. The stock solution thus prepared is coated at dry thickness of 15$\mu$ on the emulsion layer of 35 mm.-cinematographic positive raw film.

The resulting magnetic recording stripes show no exfoliation during the photographic treatment (i.e. development and fixation), and the release print is entirely safe during the repeated projection over 600 times, while no injury or damage is observed in the magnetic recording stripes.

To the contrary, magnetic recording stripes containing no formamide suffers from exfoliation at four or five portions for each 300 meters of the film during its development and fixation, and the release print is markedly injured by the repeated projection over about 50 times. Projection of this print over more than 100 times is not possible.

Further, a raw film with magnetic recording stripes obtained as in this example, can be stored over 6 months under ordinary conditions, without showing appreciable change in photographic characteristics in comparison with a similar film without said stripes.

Example 2

A mixture having the following formulation:

| | Parts by weight |
|---|---|
| $\gamma$-$Fe_2O_3$ | 40 |
| Vinyl chloride-vinyl acetate copolymer | 20 |
| Liquid nitrile rubber | 10 |
| Methyl isobutyl ketone | 60 |

is treated in a roll mill to have a paste. This paste (100 parts) is then mixed with 15 parts of ethyl acetate, 90 parts of methyl isobutyl ketone, 15 parts of ethyl Cellosolve and 5 parts of acrylamide ($C_2H_3CONH_2$) by means of a roll mill thereby to obtain a uniform solution which is ready for use as a stock solution for magnetic recording stripes.

The stock solution can be used in the same way as in Example 1 and the similar good result is obtained. The stock solution of this example has no effect on the photographic characteristics of unexposed light-sensitive films and it is particularly suitable for use on a color positive raw film.

Example 3

A mixture having the following formulation:

| | Parts by weight |
|---|---|
| $\gamma$-$Fe_2O_3$ | 20 |
| Nitrocellulose | 7 |
| Liquid nitrile rubber | 6 |
| Butyl alcohol | 2 |
| Amyl acetate | 70 |
| Ethyl Cellosolve | 15 |
| Acetamide ($CH_3CONH_2$) | 2 |

is well dispersed in a disperse mill thereby to obtain a uniform, viscous solution. This solution is coated at dry thickness of 14$\mu$ on the emulsion layer of 16 mm.-cinematographic raw film. Similar good results as in Examples 1 and 2 are obtained. Where the above-prepared solution is coated on the film having been developed and fixed, similar results can be obtained.

Example 4

A mixture having the following formulation:

| | Parts by weight |
|---|---|
| Magnetic iron oxide containing cobalt | 20 |
| Acrylic ester-acrylonitrile copolymer | 14 |
| Butyl acetate | 70 |
| Ethyl lactate | 26 |
| Oxamide [$(CONH_2)_2$] | 3 |

is well dispersed in a ball mill to have a uniform, viscous liquid. By using this liquid as a stock solution for magnetic recording stripes, similar good results can be obtained as in Examples 1, 2 and 3.

Example 5

A 5% solution of acetamide in ethyl Cellosolve is prepared and then coated on the emulsion layer of a raw film. When the subbed layer reaches the semi-dried state, a stock solution prepared in the same manner as in Example 3 with omission of 2 parts of acetamide is coated thereon. The magnetic recording stripes resulted thereby exhibit good adhesion and it is safely retained during development and fixation of the film. The release print can be used during the repeated projection over 500 times, while showing no appreciable injury.

What we claim is:

1. A photographic film with magnetic recording stripes, which comprises, on a film base, a light-sensitive photographic emulsion layer and magnetic recording stripes, between which a subbing layer is interposed, at least one of said magnetic recording stripes and subbing layer containing a carboxamide of the general formula $$R_n(CONH_2)_m$$

wherein R is a member selected from the group consisting of hydrogen atom and an aliphatic lower hydrocarbon radical which may have an oxygen-containing substituent, said hydrocarbon radical having the total carbon number of up to ten, *n* is a whole number of 0 to 1 and *m* is a whole number of 1 to 5.

2. A photographic film with magnetic recording stripes, which comprises, on a film base, a light-sensitive photographic emulsion layer and magnetic recording stripes containing less than 30% by weight, based on the dried coating weight of the magnetic recording stripes, of a carboxamide of the general formula $$R_n(CONH_2)_m$$

wherein R is a member selected from the group consisting of hydrogen atom and an aliphatic lower hydrocarbon radical which may have an oxygen-containing substituent, said hydrocarbon radical having the total carbon number of up to ten, *n* is a whole number of 0 to 1 and *m* is a whole number of 1 to 5.

3. A photographic film, as claimed in claim 1, wherein said carboxamide is at least one member selected from the group consisting of formamide, acetamide, propionamide, oxamide, malonamide, acrylamide propiolamide, tetrolamide, pyrvinamide and glyoxalamide.

References Cited

UNITED STATES PATENTS

| | | | |
|---|---|---|---|
| 1,883,559 | 10/1932 | Chipman | 96—79 XR |
| 2,950,971 | 8/1960 | Lewin | 96—79 |
| 3,220,843 | 11/1965 | Lovick et al. | 96—84 |

NORMAN G. TORCHIN, *Primary Examiner.*

R. H. SMITH, *Assistant Examiner.*

U.S. Cl. X.R.

96—39, 87